Figure 1:
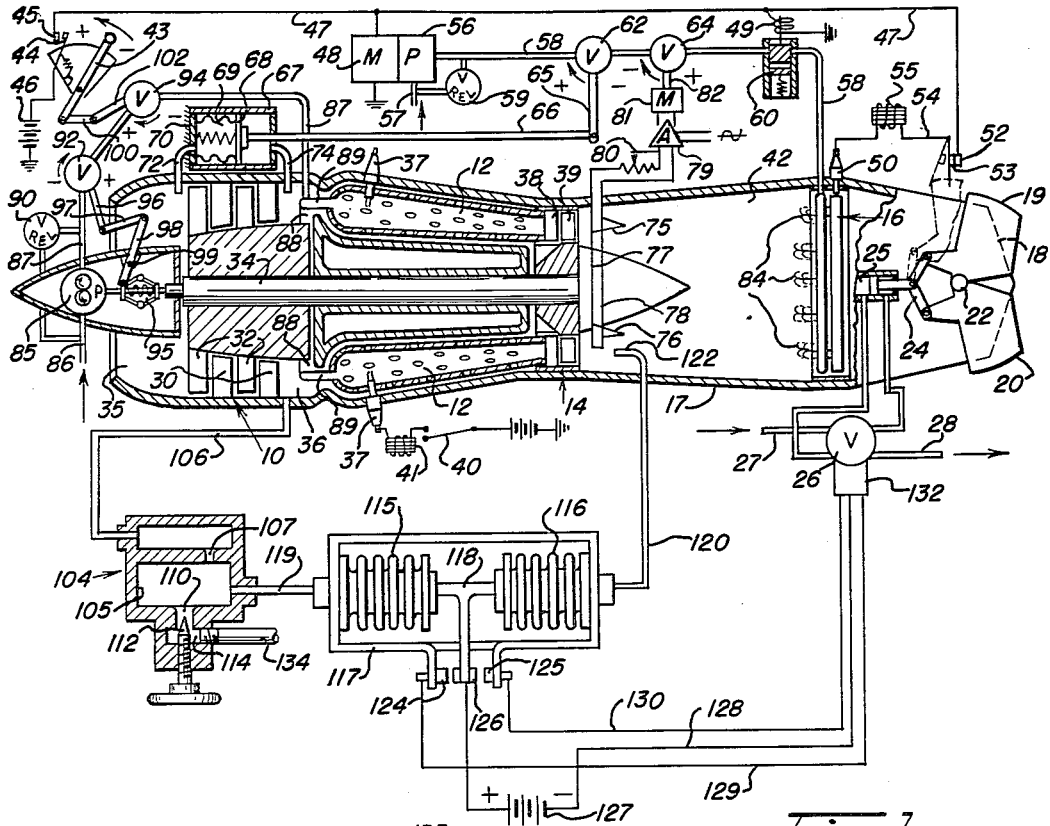

May 22, 1956    W. E. REED    2,746,242
PRESSURE RESPONSIVE INDICATING, SENSING
AND CONTROLLING DEVICES
Filed Jan. 27, 1950

INVENTOR
Wendell E. Reed

BY *Strauch, Nolan & Diggins*
ATTORNEYS

United States Patent Office 2,746,242
Patented May 22, 1956

2,746,242

PRESSURE RESPONSIVE INDICATING, SENSING, AND CONTROLLING DEVICES

Wendell E. Reed, Chula Vista, Calif., assignor to Solar Aircraft Company, San Diego, Calif., a corporation of California Application January 27, 1950, Serial No. 140,856

14 Claims. (Cl. 60—35.6)

This invention relates to pressure and temperature responsive controls and apparatus for the indication and control of flows in ducts and conduits; and more particularly to such flow indication and controls for gas turbines, ram jets, engines of the turbojet type, furnace drafts, chemical processes, pipe lines and the like.

In a conventional turbojet engine for the control of which this invention is particularly adapted in the preferred embodiment hereinafter disclosed, air entering the intake is compressed by a rotary compressor and mixed with fuel and then burned in a combustion section. The hot gases then drive a turbine which in turn drives the rotary compressor. The exhaust gases then pass through a tailpipe and issue therefrom in the form of a jet. The reaction of these gases exerts thrust which moves the vehicle, generally an airplane, forward. A characteristic of present turbojet engines is that a surplus of air is used over that required for combustion of the fuel to keep the temperature of the hot gases down to a value that is not destructive of the mechanism.

Recently successful methods and apparatus have been invented to greatly augment the mass and velocity of the exhaust gases to increase their jet action or thrust by injecting and burning additional combustible elements and the unburned exhaust gas components by means of a so-called "afterburner." By way of example, in a typical jet plane during a take-off, wave-away from a carrier deck or small field, or in a combat maneuver the afterburner consumes approximately from 16 to 20 gallons of fuel per minute, increasing the hot air output from about 2250 C. F. S. to 4200 C. F. S. in the fraction of a second required for ignition. Wide variations in fuel consumption of the primary burner also occur in operation so that the volume and temperatures of discharged gases vary widely, requiring variation in tailpipe outlet or jet nozzle or orifice area to maintain safe and effective operation. Proper control is critical, for a single erroneous operation may result in loss of the plane and its occupants.

For safe and effective operation during afterburning it is desirable that the turbine discharge temperature be maintained at a substantially constant maximum, or that turbine discharge pressure be maintained at a balanced cycle condition, such as for example exists during operation at sea level and zero miles per hour with no afterburning and the variable nozzle at minimum opening, or with afterburning and the variable nozzle or orifice at maximum opening. This discharge pressure referred to as "normal" in the art, is that which is found at any altitude of operation at the entrance to the tailpipe of a properly designed non-afterburning turbojet power plant having a fixed discharge nozzle or orifice. It is also the pressure at the entrance to a properly designed afterburning tailpipe of an afterburning turbojet power plant with the afterburner not operating, and the variable tailpipe discharge nozzle or orifice at its smallest opening. If the afterburner is operated without enlarging the tailpipe discharge area of the jet nozzle, the resulting turbine discharge pressure is higher than the normal turbine discharge pressure. Conversely, if the jet nozzle or orifice is left fully open and the afterburner is not operating, the resulting turbine discharge pressure will be below normal.

Among the factors which determine the so-called "normal" turbine discharge pressure are (1) revolutions per minute of the turbine; (2) airspeed (ram pressure or velocity head); (3) ambient temperature; (4) ambient pressure; and (5) compressor efficiency. Accordingly except for special conditions under which certain of the variables are kept constant, the normal turbine discharge pressure will not be directly proportional to the compressor discharge pressure, although it is a function thereof. While various prior nozzle or orifice controls have been proposed, none of them has successfully compensated for the foregoing wide variables in operation of jet planes from sea level to altitudes of 40,000 feet or more. The prior proposed pressure and thermal responsive controls heretofore tried have been inadequate to meet these variations. Prior pressure sensing devices have been uncertain in operation due to the wide range of ambient pressures encountered in the altitude range, and thermal response has been too sluggish and uncertain to follow the rapidly changing operational conditions. Prior to the present invention an intensive exhaustive search was conducted without success among controls engineers and vendors for a device which would correctly signal under all flying conditions, for as hereinbefore pointed out, one erroneous signal could lose a plane. When no such device was found available well over a year was spent in building and testing devices which failed to satisfy the varied requirements. The most promising of these, a pressure surge switch, when adjusted to the sensitivity necessary at 40,000 feet altitude, would trip due to fluctuations well within normal turbine operation at sea level, and when set correctly for sea level operation would not trip in response to the afterburner surge at 40,000 feet.

A further difficulty was that upon failure to pick up the first surge or signal no later signal would follow under either continued burning or blow-out conditions of the afterburner. Efforts to use more slowly igniting burners lost in large measure the afterburner advantage as an emergency safety device in wave-off from carriers and small or crowded landing fileds. In wave-off the available time for success of the maneuver is very small and its success lies mostly in giving the absolute maximum fraction of that time to the pilot to make his decision and put it into operation.

The present invention overcomes the foregoing disadvantages of the prior efforts and failures to solve the jet power plant afterburner signalling and control problems by utilizing a novel means of producing a sustained reference pressure equivalent to or bearing a predetermined relation to the normal turbine discharge pressures during the widely varying operating conditions met by such jet power plants, and which is not substantially affected by the setting of the variable tailpipe jet nozzle or the degree of afterburning, and using the differential between it and the actual turbine discharge pressure to operate any desired type of signalling or control mechanism. In carrying out the invention in its preferred embodiment, a flow box or device is used having exit and entrance orifices to create a variable standard of comparison for pressure in a duct or flow passage.

While the illustrated preferred embodiment hereinafter set forth shows the use of such differential pressure to control the size of a two-position variable jet nozzle, because of the critical nature and difficulty of such controls over an altitude range of from sea level to upward of 40,000 feet above sea level, it is equally applicable to the control of a continuously variable nozzle, to the control of fuel flow to the afterburner, to the control of both the fuel flow and the variable nozzle, or to produce any other desired effect in jet power plant controls. And as will be apparent to those skilled in the art, the invention may be usefully and advantageously applied to flow indication and controls of various types in which less complex conditions exist, as for example in furnace draft, pipe line and process controls of various types subject to flow surges or deviations from desired normal flow conditions.

A primary object of the present invention is to provide novel pressure responsive control systems and apparatus.

A more specific object is to provide a simple and effective system for controlling a variable jet nozzle on a turbojet type power plant with afterburner over a wide range of operating conditions.

Another important object is the provision of a novel device operable solely in response to variations in pressure from a prescribed normal, to operate signalling and control devices.

A more specific objective is to provide a high speed nozzle system capable of accommodating flame propagation and gas expansion at near explosive rates.

Figure 2:
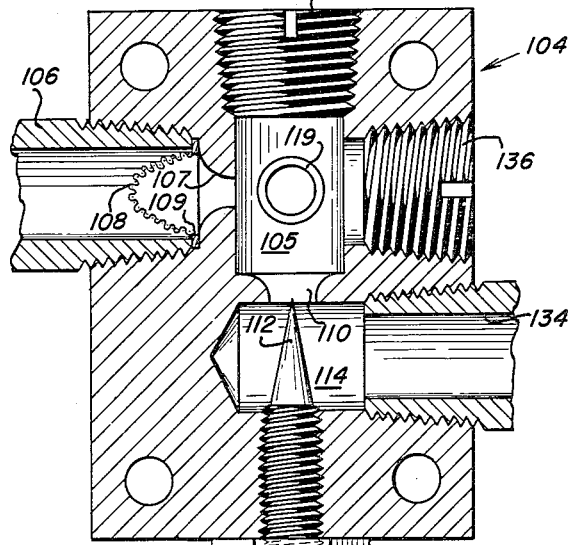

Other objects will become apparent as the description proceeds in connection with the accompanying drawing and from the scope of the appended claims. As shown in the drawing:

Figure 1 is a schematic diagram of a conventional turbojet engine equipped with a sensing system in accordance with the invention and a fuel control system for the primary burner and afterburner; and Figure 2 is a sectional view to scale of one of the elements of the sensing system shown schematically in Figure 1.

Figure 1, shows schematically a turbojet engine of conventional type, having a compressor 10, a primary burner 12, a turbine 14, and an afterburner 16, located in a tailpipe 17. The outlet nozzle 18 of the tailpipe is of such diameter as to handle all of the exhaust gases when both the turbojet engine and the afterburner are in operation without increasing the normal discharge pressure. The tailpipe 17 may be termed a duct or chamber having a restricted entrance formed by the structure of turbine 14 and a restricted exit formed by the nozzle 18 or the downstream end of the tailpipe. The primary burner may operate with or without the afterburner, but the afterburner is never operated alone. To povide proper tailpipe or nozzle areas a pair of gates 19 and 20 are pivotally mounted upon the tailpipe at 22 and so arranged that when they fully open during afterburning the full discharge area of the nozzle 18 is open and when they are closed the remaining effective area is that required to maintain a normal turbine discharge pressure when the afterburner is not in operation. For a more complete disclosure of variable nozzles of this type and the operating mechanisms therefor reference may be made to the copending applications Serial No. 12,246, filed March 1, 1948, now Patent No. 2,720,078, and Serial No. 59,944 filed November 13, 1948, now abandoned.

The gates 19 and 20 are operated through a linkage system 24 by a fluid motor 25 which is connected to a four way fluid valve 26 that delivers fluid to the right end of the motor 25 to open the gates, or to the left end of the motor to close the gates. Fluid under pressure is supplied by line 27, and fluid discharged from the inactive end of motor 25 is directed by the valve 26 to the exhaust line 28.

In the turbojet engine itself the compressor includes stationary blade or nozzle rings 30 which cooperate with rotating blade rings 32 mounted upon a driven shaft 34 to compress the air entering at 35 and to deliver it to the compressor outlet passage 36.

The compressed air then enters the primary burner 12 where it is mixed with fuel ignited by spark plugs 37, burned, and the products of combustion delivered to the turbine 14 through guide vanes 38, and thence to turbine blades 39 fixedly mounted upon shaft 34 to supply power thereto to rotate it and drive the air compressor 10. Spark plugs 37 may be energized by any suitable method which closes switch 40 so that current passes through spark coil 41 to plug 37, and need remain energized only long enough to initiate burning after which switch 40 is opened deenergizing plugs 37.

Leaving turbine 14, the gases enter a turbine discharge passage 42 in the upstream end of the tailpipe or diffuser 17. Thence the gases pass through the afterburner 16 and out the tailpipe through the nozzle 18.

To place the afterburner 16 in operation throttle 43, Figure 1, is moved in the plus direction to its full open position which will cause movable contact 44 and fixed contact 45 to be closed. Closing contacts 44 and 45 causes current from a suitable source as battery 46 to flow through conductor 47 which supplies current simultaneously to pump motor 48, solenoid coil 49 and ignition plug 50, the current to plug 50 passing through normally closed contacts 52 and 53, conductor 54 and spark coil 55. Pump motor 48 drives the rotary gear pump 56 connected at its intake side by conduit 57 to a fuel supply, not shown, and connected at its discharge side to conduit 58 leading to afterburner 16. A conventional relief valve 59 is connected between intake conduit 57 and discharge conduit 58. Also mounted in conduit 58 are the three control valves 60, 62 and 64. Valve 60 is a two-position shut-off valve which will be opened as soon as solenoid coil 49 is energized upon closing contacts 44 and 45, and closed upon deenergization of coil 49. Valves 62 and 64 are provided to control the amount of fuel pumped to afterburner 16 and are responsive to variation in pressure rise across compressor 10 and temperature immediately down stream of turbine 14, respectively.

The control element, not shown, of valve 62 is secured to an arm 65 which is loosely fixed at its lower end to a rod 66 extending into an airtight cylinder 67. Within the cylinder 67 rod 66 is secured to a spring biased piston 68 forming one end of a bellows 69. The other end of bellows 69 is formed by the end 70 of cylinder 67. Piston 68 is exposed on its inlet or ram air pressure entering the bellows through line 72, and on its free side to compressor outlet pressure through line 74 so that any relative change in pressure across compressor 10 will be reflected by movement of piston 68 and the control element of valve 62. As shown by the arrow, valve 62 will move in a plus or fuel increasing direction in response to an increase in pressure rise across compressor 10. Valve 62 varies the primary control of the fuel supply to the afterburner, the regulation being a function of altitude, engine R. P. M. and air speed.

Valve 64 is controlled by thermocouples 75 and 76 or other thermally responsive devices immediately downstream of turbine 14. As is well-known in the art, thermocouples produce a millivolt D.-C. power which varies in accordance with the temperature changes of their environment. Thermocouples 75 and 76 are connected to conductors 77 and 78. Conductor 78 leads directly into a conventional amplifier-converter 79 of a type similar to that disclosed in United States Patent No. 2,368,701 to Borden which is supplied by an A.-C. source, while conductor 77 passes through the potentiometer 80 before it leads to amplifier-converter 79 as is conventional in such temperature indicating and control circuits. The amplifier-converter 79 supplies power proportional to the signal received from thermocouples 75 and 76 to a reversible variable-speed motor 81 of any suitable type which is connected to valve 64 through drive shaft 82. This temperature responsive control is arranged to operate valve 64 in a fuel decreasing or minus direction in response to an increase in the temperautre in the turbine discharge region. The primary function of the thermocouples and the thermocouple controlled valve is to allow the afterburner to heat to the greatest degree possible commensurate with safe temperatures within the metals. Because the thermocouples are a temperature-sensitive device, they make it possible to use top temperatures in the final degree of afterburning which are somewhat hotter than would be possible relying solely on the more rapid but less sensitive signals of the pressure system.

As explained hereinbefore, the closing of contacts 44 and 45 sends current to ignition plug 50 which will ignite the fuel being introduced into the diffuser 17 just upstream of afterburner 16 as shown at 84 to start the afterburning. Since the plug 50 need be energized only long enough to start the afterburning, the contacts 52 and 53 are opened when gates 19 and 20 are in their fully open position in any suitable manner, for example as shown diagrammatically by a gate in dotted lines in Figure 1, and as will be more fully explained hereinafter.

Fuel is supplied to the primary burner from the fuel supply, not shown, by means of rotary gear pump 85 driven by main engine shaft 34. Fuel enters the pump through conduit 86 and is discharged into conduit 87 which connects with an annular conduit 88 and the fuel injection nozzles 89 for the primary burner, all of which are conventional. A relief valve 90 of any suitable design connects conduits 86 and 87 on either side of pump 85. Also fixed in the conduit 87 are the fuel control valves 92 and 94. Valve 92 is controlled by a fly-ball governor 95 mounted on shaft 34 with its inner end fixed to the shaft and its outer end slidable on the shaft. A suitable linkage, such for example as diagrammatically illustrated by arm 96, arm 97 and arm 98 pivoted at 99, transmits the movement of the outer end of governor 95 to the control element, not shown, of valve 92. An increase in the speed of rotation of shaft 34 will cause valve 92 to be moved in a minus or fuel decreasing direction. Valve 94 is controlled by the throttle 43 through a linkage such as levers 100 and 102, and any movement of the throttle 43 in either direction is transmitted directly to valve 94. It should be noted that the primary control of fuel to the primary burner is achieved by throttle controlled valve 94, the governor controlled valve 92 serving only to maintain turbine speed below some predetermined permissible maximum.

With the afterburner 16 not in operation gates 19 and 20 are closed, as shown, and the outlet passage from nozzle 18 is thereby reduced to its smallest opening. When the afterburner is placed in operation it adds additional fuel to the exhaust gases (which have a surplus of air in turbojet engines) and the mixture is largely burned before it discharges through the nozzle 18, thereby increasing the temperature and hence the volume of the exhaust gases. If the discharge pressure is allowed to increase over a "normal" value, the turbine will be slowed, the speed responsive governor 95 will supply more fuel, and the temperatures resulting from the burning gases in the primary burner 12 may reach destructive levels. To maintain a normal turbine discharge pressure after the afterburner has been placed in operation the nozzle 18 must immediately be enlarged by opening gates 19 and 20. For that reason I control variation of the size of nozzle 18 in novel manner by means of a reference pressure which constantly simulates the previously defined "normal" turbine discharge pressure. Accordingly, in my invention actual control of the nozzle opening is dependent upon the difference between the said normal turbine discharge pressure (as represented by the pressure in chamber or cavity 105, as will be described) and the actual turbine discharge pressure for any operating condition.

Referring again to Figure 1, at 104 the instrument shown in detailed construction in Figure 2, which may be aptly described as a variable comparison pressure device, is schematically illustrated. The body of the pressure device 104 has a central chamber or cavity 105 which is connected to a pipe 106 via an orifice 107 which may have a removable filter screen 108 attached to a flange 109 held in place as by pipe 106. The pipe 106 is connected to the engine so as to have its inlet subject to the static pressure of the air at the compressor outlet passage 36. It is subjected to the pressure at this point rather than that at the turbine inlet and immediately downstream of the combustors because the gas temperatures reaching the turbine inlet may be 1200° F. or higher and may include sundry solid particles of combustion which tend to deposit in the pipe 106 and the filter screen 108. The static pressure in the compressor outlet passage 36 will be higher than the ambient pressure. The central cavity 105 of the pressure device 104 besides being connected to the pipe 106 is provided with a second orifice 110 the area of which is controlled by a needle valve 112. Orifice 110 connects with a passageway 114 which is in direct communication with a zone of ambient atmospheric pressure in such manner that the pressure in passageway 114 will be maintained substantially at ambient air pressure. Air will therefore flow through pipe 106 and orirfice 107 into the cavity 105, and then through orifice 110 to the atmosphere. A feature of this cavity is that the orifices are not in line so that the orifice 110 will not be affected by the velocity head occasioned by flow through orifice 107.

The needle valve 112 is so adjusted with respect to orifice 110, and both orifices 107 and 110 are of such diameter and configuration that the pressure drop through the orifice 107 closely approximates the pressure drop through the turbine 14. The pressure drop through the orifice 110 closely approximates the pressure drop through the nozzle 18 when the afterburner 16 is not operating and the area of nozzle 18 is smallest by reason of gates 19 and 20 being closed. Figure 2, hereinafter described in detail, shows by way of example a scale section through an actual device found practical in one application of my invention.

Pressure drop through the primary burner 12 is balanced out closely by subjecting the inlet of pipe 106 solely to static pressure at the compressor discharge rather than to combined static and velocity head at the inlet to the turbine 14. As a consequence, the pressure in the cavity 105 of the pressure device 104 is the equivalent for any operating condition, of the "normal" turbine discharge pressure.

In the schematic diagram of Figure 1 a pair of resilient bellows or sylphons or the like (such as for example as shown in copending application Serial No. 21,445) are diagrammatically indicated at 115 and 116, with their outer ends fixed to a suitable frame 117 and their inner facing ends rigidly connected to a T-shaped element 118. The bellows 115 is connected to a pipe 119 which connects the interior of the bellows with cavity 105. The interior of bellows 116 is connected to a pipe 120 having at its other end an open entrance facing upstream at 122 in the tailpipe 17 at the turbine discharge, so that the interior of the bellows 116 is subjected to the combined static and velocity head of the exhaust gases from the turbine. The bellows or sylphons 115 and 116 are resiliently balanced so that when the internal pressure within them is equal they will assume a zero or neutral position.

Also mounted upon the frame 117 are a pair of electrical contacts 124 and 125 on opposite sides of a central contact 126 that is carried by the depending leg of the T-shaped element 118. The contacts 124 and 125 are so located with respect to the contact 126 that they are equally spaced therefrom when the bellows 115 and 116 are in neutral position, and so that either one or the other will be engaged by the movable contact 126 when a differential of the pressures in bellows 115 and 116 causes a shifting of the element 118. The contacts 124, 125 and 126 form part of an electric circuit which includes a battery or source of E. M. F. 127, wires 128, 129 and 130, and a motor 132 that drives the valve 26 in either direction to open or close the gates 19 and 20, depending on whether the central contact engages contact 124 or 125. The battery 127 will be in the circuit to drive the motor irrespective of whether the central contact 126 engages contact 124 or 125.

The control system subject of this application was specifically designed for afterburners used in conjunction with the jet engines designated by the U. S. Air Force as J33, J34 and J35. This type of combined power package, now known as the "turboramjet engine" is presently used in the Chance Vought F6U, XF7U and Lockheed F94 and is being contemplated by the Armed Forces for use in several other planes.

The illustrated pressure device 104 and orifices are believed to give a sufficiently close approximation to be suitable for any of the known aircraft jet engines and it is well within the scope of aerodynamicists to design orifices suitable to simulate the pressure drop through any other engine and tail pipe where such a reference pressure is desired for the control of a nozzle control of fuel or for any other indication or control purpose.

Figure 2 shows to scale a section through a pressure device that is operative in the desired manner. The body of the pressure device has its orifice 107 in direct alignment with the pipe 106 that leads to the compressor discharge pressure. The walls of the orifice 107 are rounded on the high pressure side, as are the walls of the orifice 110 on its side facing the cavity 105. In this example orifice 107 is 0.116 inch diameter and orifice 110 is 0.185 inch diameter, and the rounded high pressure sides of both orifices have radii of roughly 0.094 inch to give the desired flow characteristics or more specifically to simulate pressure drops through turbine 14. Passageway 114 which is connected to a zone of ambient pressure is threaded to receive a conduit 134 that leads to such a zone. The connection between pipe 119 and the cavity 105 is shown perpendicular to the plane of the drawing. Two other openings to the cavity 105, for such use as may be needed, are shown closed by threaded plugs 135 and 136.

In practice it is desirable to have an adjustment for either orifice 107 or 110. Needle valve 112 which adjusts the discharge to ambient atmosphere through orifice 110 has a screwdriver slot 137 and is locked in adjusted position by a pair of nuts 138. After initial adjustment of orifice 110 has once been made for a particular power plant unit the cavity 105 will thereafter be maintained at a pressure less than compressor discharge and bearing the same relation to compressor discharge pressure as does the turbine discharge pressure if the engine is operated with a normal tailpipe having a fixed jet nozzle. Any pressure actuated device such as a pressure switch or transducer can then be connected to the cavity 105 and to the turbine discharge pressure sensing pipe 120 to control any desired operation in response to difference in pressure between these points.

*Operation*

To illustrate operation of my invention let it be assumed that the afterburner 16 is not in operation and that nozzle 18 is properly set to maintain a normal turbine discharge pressure. Under these conditions the gates 19 and 20 will be fully closed. With a normal turbine discharge pressure the pressure within the pipe 120 will be equal to the pressure in the cavity 105 of the pressure device 104, and the bellows 115 and 116 will center the contact 126 between the other contacts 124 and 125. Now if the afterburner 16 is set in operation there will be a great increase in temperature and hence in volume of exhaust gas seeking to exhaust through the restricted nozzle 18. This will increase the turbine discharge pressure above its normal value because of the back pressure developed in the tailpipe. The increased pressure will be transmitted through the pipe 120 to the interior of bellows 116 and the increased pressure therein will cause the movement of the contact 126 to the left to engage contact 124, closing the circuit to motor 132 to rotate it in a direction to operate valve 26 so that fluid is delivered to the right end of fluid motor 25. This separates or opens the gates 19 and 20 until the pressure in the tailpipe is reduced and the turbine discharge pressure again becomes normal. When this condition is reached the contact 126 will disengage contact 124, stopping the motor 132 and locking the hydraulic motor 26 in the position to which it was last moved. When the afterburner operation is discontinued the action is reversed in that contact 126 moves to engage contact 125 with the result that the electric and fluid motors 132 and 25 operate to move the gates 19 and 20 to closed position.

It will be appreciated by those skilled in the art that the system can be utilized to cause the variable elements of a continuously variable nozzle to be continuously adjusted in accordance with fluctuating turbine discharge pressures to keep that pressure at its normal value. Continuously variable nozzles of types well known in the art can be used in such combination. It can also be utilized to merely shift the gates 19 and 20 illustrated in Figure 1 to either full open or full closed position in accordance with the larger changes in tailpipe pressure resulting from afterburner operation or discontinuance as explained hereinbefore. Also, instead of the system controlling the nozzle as by means of the gates 19 and 20, it could be used to automatically increase or decrease the supply of fuel to the afterburner to maintain a normal turbine discharge pressure, in which event the variation in size of the nozzle 18 required when afterburning is started or stopped could be controlled either by some automatic device or by hand. It can also be utilized to control the turbine discharge pressure when water injection is introduced.

The invention, as exemplified in the illustrated embodiment, provides a practical and inexpensive system for maintaining an artificial reference pressure in the cavity 105 that is at all times equal to the desired "normal" pressure at the turbine discharge.

While the invention has been described principally in connection with a turbojet type aircraft engine having an afterburner and two-position nozzle associated therewith, it is to be understood that the principles and objects of the invention are applicable to other types of gas turbines.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a turbojet engine having an air compressor, a turbine, and means for varying the turbine discharge pressure, a device for simulating normal turbine discharge pressures comprising a closed chamber having an inlet orifice connected to be subject to the air compressor discharge pressure; an outlet orifice connecting said chamber and a pressure below said turbine discharge pressure, the area and configuration of said inlet and outlet orifices being so related as to maintain in said chamber a pressure substantially equal to said normal turbine discharge pressure; a differential pressure responsive device connected to be subject to the pressure in said chamber between said orifices and to the turbine discharge pressure; said differential pressure responsive device being operative to control said means for varying the turbine discharge pressure.

2. In a turbojet engine having an air compressor, a turbine, a tailpipe, and means for varying the discharge jet of said tailpipe; a device for simulating normal turbine discharge pressures comprising a closed chamber having an inlet orifice connected to be subject to the air compressor discharge pressure; an outlet orifice connecting said chamber and a pressure below said turbine discharge pressure, the area and configuration of said inlet and outlet orifices being so related as to maintain in said chamber a pressure substantially equal to said normal turbine discharge pressure; a differential pressure responsive device connected to be subject to the pressure in said chamber between said orifices and to the turbine discharge pressure; said differential pressure responsive device being operative to control said means for varying the discharge jet of said tailpipe.

3. In a turbojet engine having an afterburner in its tailpipe, a variable area nozzle and means for varying the size of the said nozzle, a flow chamber device between a pair of orifices in series, the area and configuration of said orifices being so related as to maintain in said flow chamber device a reference pressure substantially equal to the desired turbine discharge pressure; a device responsive to variations between the pressure in said flow chamber device and the actual turbine discharge pressure; and means controlled by said responsive device and operative to actuate said means for varying the size of the variable area nozzle to equalize the actual turbine discharge pressure and the reference pressure.

4. In a gaseous turbine power plant including a compressor; a device for simulating normal turbine discharge pressures comprising a chamber, means forming an inlet orifice between said chamber and the power plant at the compressor discharge, and means forming an outlet orifice between said chamber and a pressure below said turbine discharge pressure, the area and configuration of said orifices being so related as to maintain in said chamber a pressure equivalent to the normal turbine discharge pressure; and a differential pressure responsive mechanism connected to said chamber between said orifices and to the turbine discharge side of said power plant to control the turbine discharge pressure.

5. In a gaseous turbine power plant having a compressor; a device for simulating normal turbine discharge pressures comprising a chamber, means forming an inlet orifice between said chamber and the area between said compressor and the turbine, and means forming an outlet orifice between said chamber and a pressure below said turbine discharge pressure, the area and configuration of said orifices being so related as to maintain a pressure equivalent to the normal turbine discharge pressure in said chamber; a differential pressure responsive mechanism connected with said chamber between said orifice and with the turbine discharge side of said power plant; and means responsive to said mechanism for controlling the turbine discharge pressure.

6. In a gaseous turbine power plant having a compressor; a device for simulating normal turbine discharge pressures comprising a chamber, a restricted fluid connection between said chamber and the power plant between said compressor and the turbine, and an adjustable restricted fluid connection between said chamber and a pressure lower than the pressure between said compressor and the turbine for coacting with said first-named fluid connection to maintain in said chamber a pressure equivalent to the normal turbine discharge pressure; a differential pressure responsive mechanism connected between said chamber and the turbine discharge side of said power plant to detect abnormalities in the actual turbine discharge pressures; and means actuated by said mechanism to compensate for any abnormalities detected.

7. A sensing apparatus for sensing variations from normal of the turbine discharge pressure of a gaseous turbine power plant having a compressor and comprising; a variable comparison pressure device including a chamber, a first orifice connected between said chamber and the discharge side of said compressor, and a second orifice connected between said chamber and a pressure below said turbine discharge pressure, the area and configuration of said orifices being so related that said orifices coact to maintain in said chamber a pressure equivalent to a normal turbine discharge pressure; and a differential pressure responsive device connected to said chamber between said orifices and to the discharge side of the turbine to sense pressure variations therebetween.

8. Apparatus for controlling the flow of fluids under varying pressures in first and second zones within a duct comprising; a flow chamber device, said device including means forming a chamber, means forming a first orifice connecting said chamber to said first zone in said duct having a pressure higher than a desired pressure in said second zone, and means forming a second orifice connecting said chamber to a pressure lower than said desired pressure, the area and configuration of said orifices being so related as to maintain in said chamber a pressure continuously representative of said desired fluid pressure; a pressure responsive device having an element movable in response to differential pressures applied to its opposite sides; means connecting one side of said pressure responsive device to said chamber between said orifices; means for applying the pressure of the fluid in said duct at said second zone to the other side of said pressure responsive device; and means responsive to movement of said element to maintain the pressure of the fluid in said second zone substantially equal to the pressure in said chamber.

9. In a fluid operated mechanism having a flow of fluid through a main chamber under pressure, said main chamber having a restricted entrance and exit; an auxiliary flow chamber having an inlet orifice and an outlet orifice; means connecting the entrance of said main chamber and said inlet orifice with a common fluid pressure source, the exit of said main chamber and said outlet orifice exhausting to pressures lower than the pressure in said main chamber, the area and configuration of said orifices being so related as to maintain in said auxiliary flow chamber a pressure substantially equal to the desired pressure in said main chamber; movable pressure responsive means connected to said chambers and operative to sense differential pressures therebetween; and operating control means responsive to movement of said pressure responsive means to vary the restricted exit of said main chamber for maintaining the pressure in said main chamber in predetermined relation with the pressure in said flow chamber.

10. A fluid conduit system comprising, a duct through which fluid is adapted to flow at varying pressures, said duct having a fluid entrance and a fluid outlet; a flow chamber device having an inlet orifice and an outlet orifice; means supplying fluid under pressure to said duct and the inlet orifice of said device from a common fluid pressure source, the outlet of said duct and the outlet orifice of said device exhausting to pressures lower than the pressure in said duct, the area and configuration of said orifices being so related as to maintain in said flow chamber device a pressure substantially equal to the desired pressure in said duct; movable means sensing differential pressures between said chamber device and said duct; and means responsive to movement of said pressure sensing device to maintain the pressure in said duct equal to the pressure in said flow chamber device.

11. In a turbojet engine having an air compressor, a turbine and a variable area nozzle; means for varying the area of said nozzle to maintain the turbine discharge pressure at a predetermined level comprising a device for simulating said predetermined turbine discharge pressure including a closed chamber having an inlet orifice connected to the discharge side of said compressor, means forming an outlet orifice between said chamber and a pressure lower than the turbine discharge pressure, the area and configuration of said orifices being so related as to maintain the pressure in said closed chamber at said predetermined level, a differential pressure responsive device connected to be subject to the pressure in said chamber between said orifices and to the turbine discharge pressure, an actuator for said variable area nozzle, and means responsive to movement of said differential pressure responsive device to control said actuator to vary the area of said nozzle.

12. In a gaseous turbine power plant having a compressor; a device for simulating normal turbine discharge pressures comprising a chamber, a restricted fluid connection between said chamber and the power plant between said compressor and the turbine, and a restricted fluid connection between said chamber and a pressure below said normal turbine discharge pressure, the area and configuration of said restricted fluid connections being such as to maintain in said chamber a pressure equivalent to the normal turbine discharge pressure; a differential pressure responsive mechanism connected between said chamber and the turbine discharge side of said power plant to detect abnormalities in the actual turbine discharge pressures; and means actuated by said mechanism to compensate for any abnormalities detected.

13. A fluid pressure operated mechanism having a flow of fluid through a main chamber under pressure, said main chamber having a restricted entrance and exit formed, respectively, by entrance and exit orifices; means forming an auxiliary flow chamber having a restricted entrance and exit formed, respectively, by entrance and exit orifices; means connecting the entrance of each of said chambers with a common fluid pressure source, the exit of each of said chambers exhausting to a pressure below the pressure in said main chamber, the diameter and configuration of said entrance and exit orifices in said flow chamber being so related as to maintain in said flow chamber a pressure in constant ratio to the pressure at said common source; pressure responsive means connected to said chambers and having an element normally occupying a neutral position and movable away from said neutral position in response to differential pressures between said chambers; and means responsive to displacement of said element away from said neutral position to generate a signal when a differential pressure exists between said chambers.

14. A fluid pressure operated mechanism having a flow of fluid through a main chamber under pressure, said main chamber having an entrance and an exit; means forming an auxiliary flow chamber having a restricted entrance and exit formed, respectively, by entrance and exit orifices; means connecting the entrance of each of said chambers with a common fluid pressure source, the exit of each of said chambers exhausting to pressures below the pressure in said main chamber, the diameter and configuration of said orifices being so related as to maintain in said auxiliary flow chamber a pressure in constant ratio with the pressure at said common source; pressure responsive means connected to said chambers and having an element normally occupying a neutral position and movable away from said position in response to differential pressures between said chambers; and means responsive to displacement of said element away from said neutral position to generate a signal when a differential pressure exists between said chambers.

References Cited in the file of this patent

UNITED STATES PATENTS

| | | |
|---|---|---|
| 1,857,386 | Lanquetin | May 10, 1932 |
| 2,225,311 | Lysholm | Dec. 17, 1940 |
| 2,411,895 | Poole | Dec. 3, 1946 |
| 2,520,434 | Robson | Aug. 29, 1950 |
| 2,520,967 | Schmitt | Sept. 5, 1950 |
| 2,550,678 | Deacon | May 1, 1951 |
| 2,667,743 | Lee | Feb. 2, 1954 |
| 2,677,233 | Jordan | May 4, 1954 |
| 2,678,698 | Lee | May 18, 1954 |

FOREIGN PATENTS

| | | |
|---|---|---|
| 587,558 | Great Britain | May 7, 1947 |
| 605,093 | Great Britain | July 15, 1948 |